March 7, 1950 J. J. KASHERGEN 2,499,649
SEPARABLE SWIVEL JOINT OR SPRING LOCK SWIVEL
Filed March 1, 1946
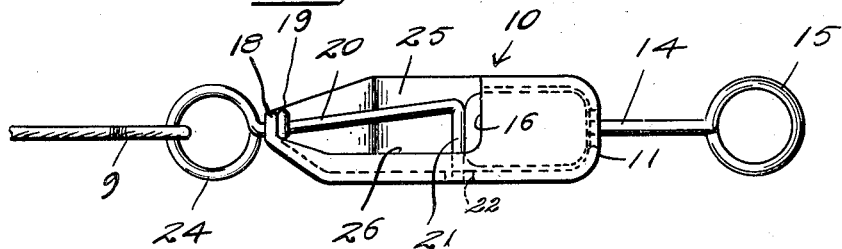
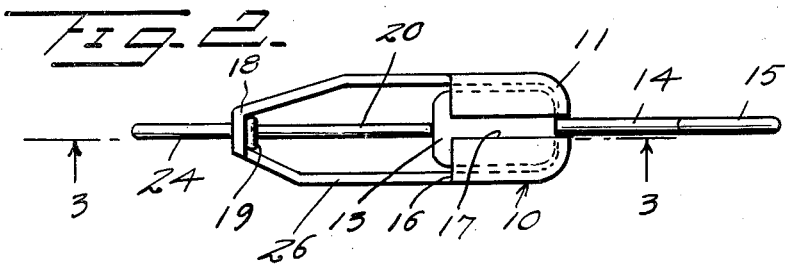
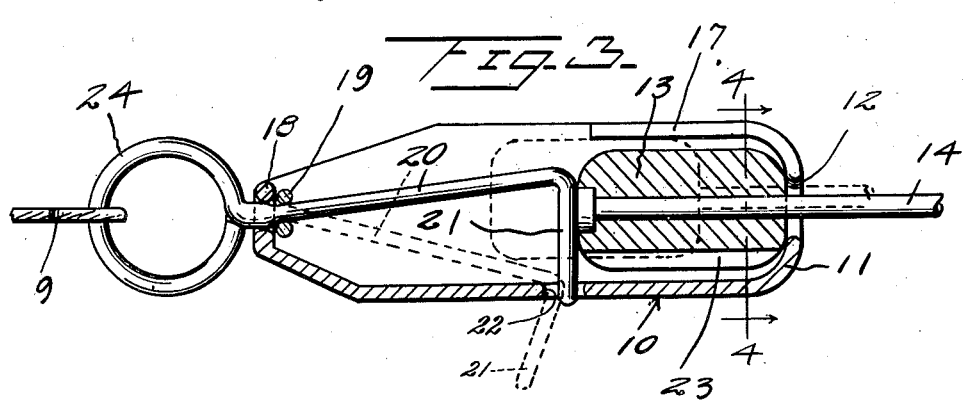
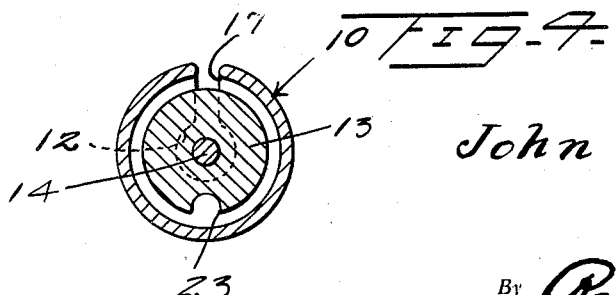
Inventor
John J. Kashergen
By Randolph & Beavers
Attorneys Patented Mar. 7, 1950

2,499,649

UNITED STATES PATENT OFFICE 2,499,649

SEPARABLE SWIVEL JOINT OR SPRING LOCK SWIVEL

John J. Kashergen, Bell, Calif.

Application March 1, 1946, Serial No. 651,092

5 Claims. (Cl. 287—91)

1

This invention relates to a swivel-joint adapted for use on a fish line, lag line or for a connection between any other mechanical device having relatively revolving motion.

One of the main features of this invention resides in the fact that the inter-connected parts, as for instance a stator and a rotor, are so joined together, that they may be instantaneously separated. In this manner, for instance, the hook end, after a fish has been caught may be easily detached and replaced by another hook of which there may be several in reserve so that the fisherman may be able to immediately proceed with his fishing, whether as a sport or as a means of livelihood.

In the drawing, wherein like numerals indicate the same details in the different views, one embodiment is illustrated and:

Figure 1 represents a side elevation of the swivel joint;

Figure 2 is a top plan view of Figure 1;

Figure 3 is an enlarged longitudinal sectional view taken along the plane of the line 3—3 of Figure 2, and Figure 4 is a cross section taken along the plane of the line 4—4 of Figure 3.

Added features and advantages will be clear from the subjoined description with the aid of the drawing.

This swivel joint consists of a shell like body 10, the stator, of metal or other plate, bent to form a hollow casing or cylinder with a bottom 11 at its rear end, furnished with a central aperture 12.

An elongated head 13 (the rotor) fits loosely in the rear end of the body or casing 10 which normally, when in use, contacts with the rear end 11 so as to exert a drag thereon from the fish line 9 as transmitted to the head 13 and a shank 14 having an eye 15 carrying the fish hook, not shown. The shank 14 moves freely in the aperture 12 axially, and the full cylindrical portion of the body or casing 10 terminates at the edge 16 for a length about the same as that of the head 13. The shank 14 is swivelly mounted in the head or rotor 13 to rotate therewith or relatively thereto. However, a longitudinal slot 17 is provided in the casing 10 for easy assembly or removal of the head 13, when the same is pushed forward in the casing or body (see dotted lines). The head 13 may then be lifted out of said body since the slot 17, which runs back to the aperture 12 is made wide enough for the shank to pass through the same.

The body or casing 10 tapers forwardly and

2 terminates with an apertured abutment 18 against which a collar 19 contacts, and which is secured on a rod 20 having a downwardly bent nose portion 21, which forms a spring lock, for abutting with the front end of the head 13 to press it rearwards against the wall 11 of the casing or body 10. The pointed nose end 21 normally engages in a small opening 22 in the bottom of the casing or body 10 to steady the spring rod 20 and prevent it from turning separately.

In order to release the spring lock for separating the head 13 from the body 10, the rod 20 is pushed down into the dotted position as seen in Figure 3. This then permits the head 13 to be pushed forward in the body 10, also denoted by dotted lines, and so as to be bodily lifted out.

For facilitating assembling, a groove 23 is furnished on the underside of the head 13. By means of this, the head will ride on the rod 20 to be guided into operating position, while the spring rod is depressed as indicated by dotted lines. The forward end of the rod 20 is provided outside the casing with a loop 24, to which the fish line 9 is attached.

In order to facilitate the manipulation of the spring lock, only one side wall 25 remains in the body 10, while the opposite side wall is removed along the edge 26 (see Figure 1). It will thus be quite easy to reach the spring rod 20 from the one side to depress it from engagement with the end of the head 13, to release the latter preparatory to removal.

During operation, the swivel action clearly takes place between the contacting surfaces of head 13 and the nose 21 of the spring rod 20, the head 13 rotating while the rod and the casing or body 10 are stationary together with the fish line 9 carried by the loop 24.

It is apparent that the shank 14 is free to swivel in the rotor head 13, thus allowing for a double swiveling action.

It is to be understood that the invention as herein disclosed is not limited to the details herein described, but that it may be varied without departing from the spirit of the invention as defined by the subjoined claims.

I claim:

1. A separable spring lock swivel, comprising a stator member and a rotor member and means for quick disconnection between said members; the stator member consisting of a cylindrical hollow casing in which said rotor member is mounted for rotary and axial movements, said stator member having an opening disposed normally remote to the rotor member; said means consisting of a spring arm secured at the forward end of said casing and provided with a bent nose portion adapted normally to contact with said rotor member to press it against the rear end of said casing and away from the opening thereof; said spring arm being yieldably displaceable relatively to the stator and out of engagement with the rotor member to permit axial movement and removal of said rotor member through said opening, and said stator member having a second opening for loosely receiving the bent nose of the spring arm and through which the bent nose is movable when displaced out of engagement with the rotor member.

2. A separable spring lock swivel, comprising a stator member and a rotor member and means for quick disconnection between said members; the stator member consisting of a cylindrical hollow casing in which said rotor member is mounted for rotary and axial movements and having an opening adjacent the forward end thereof; said means consisting of a spring arm secured at the forward end of said casing and provided with a bent nose portion adapted normally to contact with said rotor member to press it against the rear end of said casing; said spring arm being yieldably displaceable relatively to the stator and out of engagement with the rotor member to permit axial movement and removal of said rotor member through said opening, said stator member having a second opening for loosely receiving the bent nose of the spring arm and through which the bent nose is movable when displaced out of engagement with the rotor member and means on said members whereby the swivel may be interposed between sections of a fishline.

3. A separable spring lock swivel, comprising a stator member and a rotor member and means for quick disconnection between said members; the stator member consisting of a cylindrical hollow casing in which said rotor member is mounted for rotary and axial movements, said casing having a rear end provided with an aperture; said means consisting of a spring arm secured at the forward end of said casing and provided with a bent nose portion adapted normally to contact with said rotor member to press it against the rear end of said casing, said casing having an opening intermediate of its ends through which the bent nose of the spring arm is displaceable outwardly of the casing and out of engagement with the rotor member; said spring arm, upon being released from said contact, permitting axial movement and removal of said rotor member, through the forward end of the casing which is provided with a suitable opening, the rotor member consisting of a head within the casing, an axial shank extending from said head through said aperture in the rear wall of the casing, and said casing having a forwardly extending slot between said aperture and said forward opening.

4. A separable spring lock swivel, comprising a stator member and a rotor member and means for quick disconnection between said members; the stator member consisting of a cylindrical hollow casing in which said rotor member is mounted for rotary and axial movements, said casing having a rear end provided with an aperture; said means consisting of a spring arm secured at the forward end of said casing and provided with a bent nose portion adapted normally to contact with said rotor member to press it against the rear end of said casing, said casing having an opening intermediate of its ends through which the bent nose of the spring arm is displaceable outwardly of the casing and out of engagement with the rotor member; said spring arm, upon being released from said contact, permitting axial movement and removal of said rotor member, through the forward end of the casing which is provided with a suitable opening, the rotor member consisting of a head within the casing, an axial shank extending from said head through said aperture in the rear wall of the casing, said casing having a forwardly extending slot between said aperture and said forward opening, and means on said members whereby the swivel may be interposed between sections of a fishline.

5. A separable spring lock swivel, comprising a stator member and a rotor member and means for quick disconnection between said members; the stator member consisting of a cylindrical hollow casing in which said rotor member is mounted for rotary and axial movements; said means consisting of a spring arm secured at the forward end of said casing and provided with a bent nose portion adapted normally to contact with said rotor member to press it against the rear end of said casing, said casing having an opening intermediate of its ends through which the bent nose of the spring arm is displaceable outwardly of the casing and out of engagement with the rotor member; said spring arm, upon being released from said contact, permitting axial movement and removal of said rotor member, through the forward end of the casing which is provided with a suitable opening, the rotor member consisting of a head within the casing, an axial shank extending from said head, the rear wall of the casing having an aperture through which the shank slidably and rotatably extends, said casing having a forwardly extending slot between said aperture and said forward opening, and said head having a longitudinal groove adapted to ride on said spring arm to facilitate assembling of said members.

JOHN J. KASHERGEN.

REFERENCES CITED

The following references are of record in the file of this patent:

UNITED STATES PATENTS

| Number | Name | Date |
| --- | --- | --- |
| 1,225,100 | Aubrey | May 8, 1917 |
| 1,275,018 | Growder | Aug. 6, 1918 |
| 1,444,876 | Hanson | Feb. 13, 1923 |